US 11,996,751 B2
May 28, 2024

(12) United States Patent
Tamai et al.

(10) Patent No.: US 11,996,751 B2
(45) Date of Patent: May 28, 2024

(54) ELECTRIC MOTOR

(71) Applicant: MAHLE ELECTRIC DRIVES JAPAN CORPORATION, Shizuoka-ken (JP)

(72) Inventors: Masafumi Tamai, Numazu (JP); Ryosuke Suzuki, Numazu (JP); Yoshio Matsukawa, Numazu (JP)

(73) Assignee: MAHLE ELECTRIC DRIVES JAPAN CORPORATION, Numazu (JP)

( * ) Notice: Subject to any disclaimer, the term of this patent is extended or adjusted under 35 U.S.C. 154(b) by 552 days.

(21) Appl. No.: 17/277,073

(22) PCT Filed: Sep. 20, 2018

(86) PCT No.: PCT/JP2018/034841
§ 371 (c)(1),
(2) Date: Mar. 17, 2021

(87) PCT Pub. No.: WO2020/059083
PCT Pub. Date: Mar. 26, 2020

(65) Prior Publication Data
US 2021/0384791 A1    Dec. 9, 2021

(51) Int. Cl.
*H02K 5/22*    (2006.01)
*H01R 13/62*   (2006.01)
(Continued)

(52) U.S. Cl.
CPC ............. *H02K 3/522* (2013.01); *H02K 21/16* (2013.01); *H02K 2203/06* (2013.01)

(58) Field of Classification Search
CPC .... H02K 3/522; H02K 21/16; H02K 2203/06; H01R 13/5202; H01R 4/48; H01R 13/62; H01R 13/5205
(Continued)

(56) References Cited

U.S. PATENT DOCUMENTS 4,627,683 A * 12/1986 Shimomura ........... H02B 1/048
                                                248/27.3
6,750,574 B2 * 6/2004 Okazaki ................ H02K 3/522
                                                310/90
(Continued)

FOREIGN PATENT DOCUMENTS

JP    2007-174162 A    7/2007
JP    2008-131820 A    6/2008
(Continued)

OTHER PUBLICATIONS

International Search Report for PCT/JP2018/034841 dated Dec. 18, 2018.

*Primary Examiner* — Burton S Mullins
(74) *Attorney, Agent, or Firm* — Pearne & Gordon LLP

(57) ABSTRACT

Provided is an electric motor in which it is possible to accurately leading-out terminal sections of a magnet wire that constitutes a stator coil in a prescribed leading-out direction as lead wires. A wire cover formed from a hard insulating resin is press-fitted into a wire leading-out hole provided in an end member that closes one end of a motor housing, and lead wires are led out to an exterior through through-holes provided in the wire cover. Crush ribs are provided to side surfaces of a head part of the wire cover, and, due to crushing of the crush ribs and press-fitting of the wire cover into the wire leading-out hole, the wire cover is prevented from inclining within the wire leading-out hole and a leading-out direction of the lead wires is prevented from deviating from the prescribed leading-out direction.

17 Claims, 9 Drawing Sheets

(51) Int. Cl.
*H02K 3/52* (2006.01)
*H02K 21/16* (2006.01)

(58) Field of Classification Search
USPC .......... 310/71; 439/681, 557, 350, 271, 371, 439/278
See application file for complete search history.

(56) References Cited

U.S. PATENT DOCUMENTS

| | | | |
|---|---|---|---|
| 8,770,990 B2 * | 7/2014 | Sytsma | H01R 13/504 439/76.1 |
| 11,355,994 B2 * | 6/2022 | Kizu | H02K 5/22 |
| 2007/0139288 A1 | 6/2007 | Shigemoto | |
| 2014/0125173 A1 * | 5/2014 | Hayashi | H02K 5/10 310/88 |
| 2016/0111931 A1 * | 4/2016 | Kakuda | H02K 5/08 310/43 |
| 2019/0044406 A1 | 2/2019 | Yamamoto | |
| 2020/0039578 A1 * | 2/2020 | Nakayama | B62D 5/0475 |
| 2020/0195097 A1 * | 6/2020 | Kodama | H02K 5/225 |
| 2021/0143708 A1 * | 5/2021 | Hattori | H02K 5/1732 |

FOREIGN PATENT DOCUMENTS

| | | | | |
|---|---|---|---|---|
| JP | 2008131820 A * | 6/2008 | | H02K 3/50 |
| JP | 2017-139830 A | 8/2017 | | |
| WO | 2014/192557 A1 | 12/2014 | | |
| WO | 2017/134959 A1 | 8/2017 | | |
| WO | WO 2019054090 A1 * | 3/2019 | | H02K 3/50 |

\* cited by examiner (A)

(B)

(A)

(B)

(C)

ELECTRIC MOTOR

TECHNICAL FIELD

The present invention relates to an electric motor used in order to drive electric power steering or other suitable loads.

BACKGROUND ART

The present invention pertains to an electric motor provided with a motor body that is formed from a stator and a rotor, and a motor housing that accommodates the motor body. The motor housing is configured from, e.g., a body portion having a cylindrical part, and first and second end members that respectively close one axial end and another axial end of the body portion.

The first and second end members that close the one end and the other end of the motor housing may be simple lids, or may be a combination of a lid and a frame that supports, inter alia, a component constituting a drive circuit of the motor. In addition, the first and second end members may be configured so that one of the end members is provided integrally with a body of the motor housing, or may be configured so that both of the end members are provided separately from the motor housing. Furthermore, in cases where a structure is employed in which the body portion of the motor housing is divided into a first housing half and a second housing half by an axial-direction intermediate part, and in which the body portion of the motor housing is assembled by linking the two housing halves, the first end member and the second end member can be formed on the first housing half and the second housing half, respectively.

In this specification, a rotating shaft of the motor is led to an exterior (toward a load side) from the second-end-member side among the first and second end members that respectively close one end side and another end side of the motor housing.

The stator constituting the motor body is provided with, e.g., an annular stator core having numerous teeth on an inner-peripheral side thereof, and a multiphase stator coil configured by winding a magnet wire around the teeth of the stator core. The stator is held by an inner periphery of the body portion of the motor housing.

The rotor is provided with a rotor core, a plurality of permanent magnets that are attached to the rotor core in order to form a multipolar magnetic field on an outer-peripheral side of the rotor core, and a rotating shaft coupled with an axial center part of the rotor core. The rotor is arranged on an inner side of the stator in a state of sharing a same center axis as the stator, and is oriented such that magnetic poles of the magnetic field formed on the outer-peripheral side of the rotor core face the teeth of the stator core with a gap interposed therebetween. The rotating shaft of the rotor is rotatably supported by first and second bearings that are respectively held by the first end member and the second end member that respectively close the one axial end and the other axial end of the motor housing.

As in cases where this type of motor is used as a drive source of an electric power steering, the motor is frequently used in a form in which a mechanically and electrically integrated drive device is configured by integrating a mechanical portion that includes the motor housing and the motor body accommodated therein and an electrical unit portion that is provided with a circuit for driving or controlling the motor. In cases of configuring such a mechanically and electrically integrated drive device, a configuration is often adopted in which the electrical unit portion is held by the end member that closes the one axial end of the motor housing, and in which a terminal section of the multiphase stator coil and the electrical unit are connected by a suitable means.

Various structures for connecting the terminal section of the stator coil and the electrical unit have been proposed. However, in order to simplify the structure and omit connecting bars or other connecting members, it is preferable to employ a structure in which: from among terminal portions of a magnet wire constituting the stator coil (i.e., terminal sections of the coil in each phase), terminal portions that must be connected to the electrical unit are used as lead wires; the lead wires are caused to pass through the end member that closes the one end of the motor housing and are led out linearly to the exterior (toward the electrical-unit side); and distal ends of the led out lead wires are directly connected by soldering or welding to prescribed terminal sections provided to the electrical-unit side, as indicated in Patent Document 1.

PRIOR ART DOCUMENTS

Patent Documents

[Patent Document 1] Japanese Laid-open Patent Application No. 2017-139830

DISCLOSURE OF THE INVENTION

Problems to be Solved by the Invention

As indicated in Patent Document 1, in cases where there is employed a structure in which terminal portions of a magnet wire constituting a stator coil are used as lead wires, the lead wires are caused to pass through an end member of a motor housing and are led out linearly to an exterior, and distal ends of the led out lead wires are directly connected to terminal sections provided to the electrical-unit side, it is preferable to make it possible to automatically connect the distal ends of the lead wires and the electrical-unit-side terminal sections through use of an automatic assembly machine. For this purpose, it is necessary to maximally reduce an amount by which a leading-out direction of the lead wires deviates from a prescribed leading-out direction, and to make it possible to keep an amount by which distal-end positions of the lead wires deviate from prescribed positions within a permissible range. When the amount by which the distal-end positions of the lead wires deviate exceeds the permissible range, a positional relationship between the distal ends of the lead wires and the electrical-unit-side terminal section will not be regular (e.g., the distal ends and the terminal section do not correctly overlap) during attachment of the electrical unit to an end member that closes one end side of the motor housing, therefore making it impossible to automatically connect the distal ends of the lead wires and the electrical-unit-side terminal section through use of an automatic assembly machine, etc.

In the structure described in Patent Document 1, a configuration is adopted in which the inside diameter of a wire leading-out hole provided to the end member of the motor housing for the purpose of leading out the lead wires is set sufficiently greater than the outside diameter of the lead wires, and the lead wires are led out without coming into contact with the end member. However, in cases where such a leading-out structure is employed, it is difficult to lead out the lead wires in a state where the lead wires are always oriented in a fixed leading-out direction because the lead wires are not restrained. In addition, the lead wires contact an inner surface of the wire leading-out hole if the leading-out direction of the lead wires deviates greatly from the regular leading-out direction; therefore, in cases where the end member that closes the one end of the motor housing is made of metal, there is a problem in terms of electrical insulation between the lead wires and the end member.

It is considered that an insulating-resin wire cover provided with a through-hole that extends linearly is inserted into the wire leading-out hole, and the lead wires are led out through the through-hole provided to the wire cover. In this case, in order to reduce the amount by which the distal-end positions of the lead wires deviate from the prescribed positions, it is necessary to use a hard material that does not readily deform as the wire cover, and it is also necessary to prevent the wire cover from inclining within the wire leading-out hole.

It is considered that the wire cover is configured so as to be in a press-fitted state within the wire leading-out hole in order to prevent the wire cover from inclining within the wire leading-out hole. However, when the wire cover formed from a hard insulating resin is to be press-fitted into the wire leading-out hole, excessive force is applied to the entirety of the wire cover, and it is impossible to avoid damaging the wire cover. Therefore, in cases where a wire cover formed from a hard insulating resin is used, it is necessary to impart clearance in close fitting of the wire cover and the wire leading-out hole. However, when clearance is imparted in the close fitting of the wire cover and the wire leading-out hole, a space is formed between the wire leading-out hole and the wire cover, and it is impossible to prevent the wire cover from inclining within the wire leading-out hole. Therefore, it is difficult to impart high precision in the leading-out direction of the lead wires.

An object of the present invention is to provide an electric motor in which terminal portions of a magnet wire that constitutes a stator coil are used as lead wires, and the lead wires are caused to pass through an end member that closes one axial end of a motor housing and are led out linearly to an exterior, it being possible to impart high precision in a leading-out direction of the lead wires, and to reduce deviation in distal-end positions of the led out lead wires.

Means to Solve the Problems

The present invention addresses the matter of providing an electric motor having a structure in which a motor body is accommodated in a motor housing, the motor body comprising a stator that has a multiphase stator coil wound by a magnet wire and a rotor in which a magnetic field is configured by permanent magnets. In the electric motor according to the present invention, a wire leading-out hole of which one axial end opens to an exterior and another axial end opens within the motor housing is provided in a metal end member that closes one axial end of the motor housing in a state in which an axis of the wire leading-out hole is oriented in a prescribed wire leading-out direction. In addition, in the electric motor according to the present invention, among terminal portions of the magnet wire constituting the multiphase stator coil, terminal portions that must be led out to the exterior are used as lead wires, and the lead wires are shaped so as to extend linearly along the prescribed wire leading-out direction through the wire leading-out hole. Moreover, in the electric motor according to the present invention, a wire cover that is formed from a hard insulating resin and has through-holes extending linearly is inserted into the wire leading-out hole in a state in which axis of the through-holes are oriented in the prescribed wire leading-out direction, and the lead wires are led out in the prescribed wire leading-out direction through the through-holes provided in the wire cover.

In order to achieve the aforementioned object, the description and drawings of the present application discloses at least first to sixth aspects indicated below.

<First Aspect>

The wire cover used in the first aspect has, in side surfaces thereof, a plurality of crush ribs that are lined up along a circumferential direction of the wire leading-out hole, and is press-fitted into the wire leading-out hole in a state in which the plurality of crush ribs have been crushed. The wire cover also comprises a received part having, at a portion arranged at a position nearer to another axial-end side of the wire leading-out hole than the crush ribs within the wire leading-out hole, a portion oriented toward the other axial-end side of the wire leading-out hole. A wire-cover-receiving part is provided to an inner side of the wire leading-out hole, the wire-cover-receiving part having a portion oriented toward the received part of the wire cover inserted into the wire leading-out hole, and the received part of the wire cover inserted into the wire leading-out hole is received by the wire-cover-receiving part.

When the crush ribs are provided to the side surfaces of the wire cover as indicated above, it is possible to configure the wire cover into a press-fitted state in a state in which force acts in a concentrated manner on portions of the crush ribs when the wire cover is inserted into the wire leading-out hole, and in which only the portions of the crush ribs have been crushed, and therefore the hard wire cover can be held in a press-fitted state within the wire leading-out hole without damage to the wire cover. In addition, the wire cover is press-fitted within the wire leading-out hole in a state in which the received parts of the wire cover have butted against the wire-leading-out-hole-side wire-cover-receiving parts, and therefore it is possible to reduce deviation arising between a center axis of the wire cover and a center axis of the wire leading-out hole, as well as to impart high precision to the leading-out direction of the lead wires, and it is also possible to reduce positional deviation of the distal ends of the led out lead wires.

<Second Aspect>

The present aspect is applied to the first aspect, and in the present aspect, a plurality of swaged parts lined up along a circumferential direction of an opening at one axial end of the wire leading-out hole are established at the end member, and the plurality of swaged parts are swaged so as to come into contact with the wire cover inserted into the wire leading-out hole, whereby the received part of the wire cover is pressed against the receiving part provided to the inner side of the wire leading-out hole.

When the plurality of swaged parts lined up along the circumferential direction of the opening at one axial end of the wire leading-out hole are established at the end member in which the wire leading-out hole is formed and the plurality of swaged parts are swaged so as to come into contact with the wire cover inserted into the wire leading-out hole in this manner, it is possible to more reliably position the wire cover within the wire leading-out hole, and therefore it is possible to impart high precision to the leading-out direction of the lead wires.

<Third Aspect>

The present aspect is applied to the second aspect, and in the present aspect, a plurality of recesses respectively corresponding to the plurality of swaged parts are provided to an end part of the wire cover that is arranged near one axial end of the wire leading-out hole within the wire leading-out hole, and swaged portions of the swaged parts are accepted by the corresponding recesses.

When such a configuration is adopted, the swaged portions of the swaged parts bite into the recesses in the wire cover, and the wire cover is even more reliably positioned. Therefore, it is possible to even more reliably position the wire cover within the wire leading-out hole.

<Fourth Aspect>

The fourth aspect is applied to any of the first to third aspects, and the present aspect is configured as follows.

(a) The wire cover integrally has a head part arranged near one axial end of the wire leading-out hole when the wire cover is inserted into the wire leading-out hole, and a trunk part arranged closer to the other axial-end side of the wire leading-out hole than the head part.

(b) The head part of the wire cover has an enlarged shape such that a contour line of a horizontal cross-section of the head part is arranged further to the outer side than a contour line of a horizontal cross-section of the trunk part, and the received part is formed at the end part of the head part that is near the trunk part.

(c) The wire leading-out hole has a first hole section that accommodates the head part of the wire cover, and a second hole section that accommodates the trunk part of the wire cover, the wire-cover-receiving part being provided at a boundary section between the first hole section and the second hole section.

(d) The plurality of crush ribs are provided in a state of protruding from the side surfaces of the head part of the wire cover.

When the crush ribs are provided to the side surfaces of the enlarged head part as described above, it is possible to increase a wall thickness of a portion present between the through-holes and the crush ribs of the wire cover, and therefore it is possible to reliably prevent the wire cover from being damaged when the crush ribs are crushed and the wire cover is press-fitted into the wire leading-out hole. In addition, it is possible to configure the thickness of a portion other than the portion of the wire cover where the crush ribs are provided (i.e., the thickness of the trunk portion) as a required minimum thickness for providing the through-holes through which the lead wires are inserted, and therefore less of a resin material constituting the wire cover can be used.

<Fifth Aspect>

The fifth aspect is applied to any of the first to fourth aspects, and in the present aspect, at least portions of the wire cover at which the crush ribs are provided, and at least portions of the wire leading-out hole at which the portions where the crush ribs are provided to the wire cover are press-fitted, are formed so that contour shapes of horizontal cross-sections in each section along each of the axial directions have N-fold symmetry (where N is an integer equal to or greater than 2) with respect to the respective center axis.

The feature of "having N-fold symmetry with respect to the respective center axis" refers to a feature in which, when a given figure (in the present example, the contour shapes of the horizontal cross-sections in each of the wire cover and the wire leading-out hole) is caused to rotate about a center axis thereof, the figure has rotational symmetry so as to overlap an original figure with each rotation of (360/N) degrees, i.e., has rotational symmetry so as to overlap the original figure N times each time the figure rotates once.

In order to impart N-fold symmetry to the contour shapes of the horizontal cross-sections of at least the portions of the wire cover at which the crush ribs are provided, and at least the portions of the wire leading-out hole at which the portions where the crush ribs are provided to the wire cover are press-fitted, it is necessary not only to impart N-fold symmetry to the contour shapes of the horizontal cross-sections of the body portion of the head part of the wire cover (i.e., the portion excluding the crush ribs), but also to impart N-fold symmetry to an array of the plurality of crush ribs. It is also necessary to form the contour shape of the horizontal cross-sections of at least the portions of the wire leading-out hole at which the portions where the crush ribs are provided to the wire cover are press-fitted in a shape similar to the contour shape of the horizontal cross-sections of the portions of the wire cover where the crush ribs are provided.

When rotational symmetry is imparted to the contour shape of the horizontal cross-sections of at least the portions of the wire cover at which the crush ribs are provided, and also to the contour shape of the horizontal cross-sections of at least the portions of the wire leading-out hole at which the portions where the crush ribs are provided to the wire cover are press-fitted, as described above, it is possible to adopt a configuration in which equal force acts on the plurality of crush ribs during insertion of the wire cover into the wire leading-out hole, and in which the plurality of crush ribs are crushed in the same manner. Therefore, it is possible to reduce the deviation arising between the center axis of the wire cover and the center axis of the wire leading-out hole, and to increase the precision of the leading-out direction of the lead wires.

<Sixth Aspect>

The sixth aspect is applied to any of the first to fifth aspects, and in the present aspect, an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

The present aspect is not limited to cases where all of the lead wires led out to the exterior of the motor housing are led out through the wire cover. Rather, cases where only some lead wires among the numerous lead wires led out from the motor housing are led out through the wire cover, and where the other lead wires are led out to the exterior through other means, are also encompassed in the technical scope of the present aspect.

Advantageous Effects of the Invention

According to the present invention, by providing the crush ribs to the side surfaces of the wire cover formed from a hard insulating resin, press-fitting the wire cover into the wire leading-out hole in a state in which the crush ribs have been crushed, and receiving the received parts of the wire cover through use of the wire-cover-receiving parts provided to the inner side of the wire leading-out hole, the precision of positioning the wire cover within the wire leading-out hole is increased; therefore, it is possible to impart high precision to the leading-out direction of the lead wires and to reduce variation in the distal-end positions of the led out lead wires. Therefore, according to the present invention, in cases where a mechanically and electrically integrated drive device is configured by attaching the electrical unit that drives and controls the motor to the end member that closes the one end of the motor housing, it is possible to more efficiently connect the lead wires and the electrical unit by using an automatic assembly machine, etc., and to easily assemble the device.

MODE FOR CARRYING OUT THE INVENTION

Figure 1:
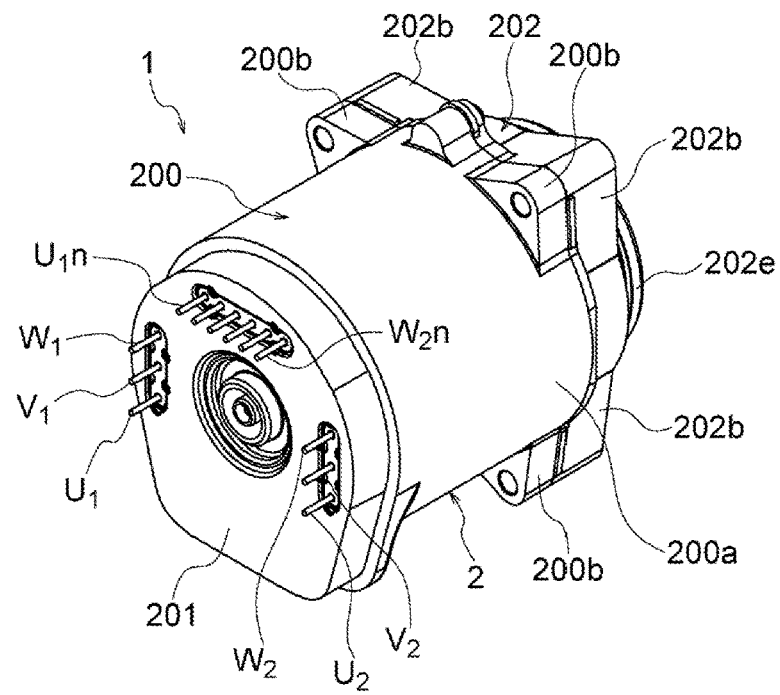
FIG. 1 is a perspective view showing an external appearance of a motor according to one embodiment of the present invention.
Figure 2:
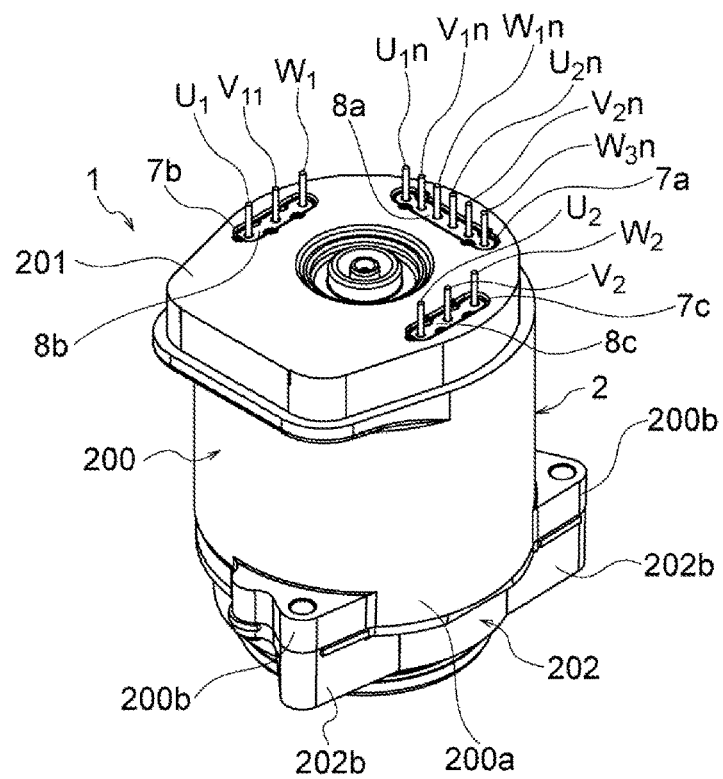
FIG. 2 is a perspective view showing the external appearance of the motor shown in FIG. 1 from a different direction than that in FIG. 1.

An embodiment of an electric motor according to the present invention is described in detail below with reference to the accompanying drawings.

FIGS. 1 to 5 show the entire configuration of the electric motor 1 according to the present embodiment. In these drawings, reference symbol 2 indicates a motor housing, and reference symbol 3 indicates a motor body (see FIGS. 4 and 5) accommodated within the motor housing.

The motor housing 2 is configured from a cylindrical part 200 formed in a cylindrical shape, and a first end member 201 and a second end member 202 that respectively close one axial end and another axial end of the cylindrical part 200. In the example shown in the drawings, the first end member 201 is formed integrally with the cylindrical part 200, and the second end member 202 is formed separately from the cylindrical part 200. These parts of the motor housing 2 are formed from aluminum or another metal material.

The second end member 202 is formed substantially in a cup shape, and a cylindrical part 202a (see FIG. 4) formed on one axial-end side of the second end member 202 is closely fitted to an inner periphery of another axial end 200a of the cylindrical part 200.

Three lug parts 200b are formed on an outer periphery of the other end 200a of the cylindrical part 200, the lug parts 200b being lined up with gaps therebetween in the circumferential direction of the cylindrical part 200. In addition, three lug parts 202c are formed on an outer periphery of the second end member 202, the lug parts 202c being coordinated with each of the three lug parts 200c on the outer periphery of the cylindrical part 200. The corresponding lug parts provided respectively to the cylindrical part 200 and the second end member 202 are fastened together by bolts 4, whereby the second end member 202 is coupled with the cylindrical part 200.

Figure 4:
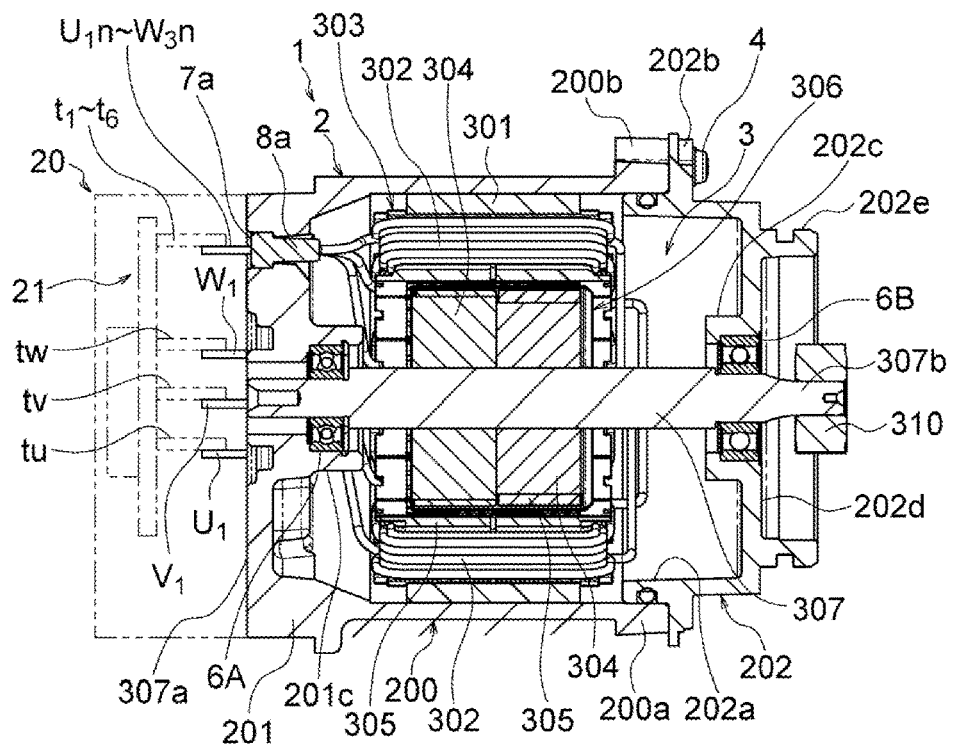
FIG. 4 is a cross-sectional view showing an internal structure of the motor in FIG. 1 in a cross-section along line A-A in FIG. 3.

As shown in FIG. 4, a first bearing-holding part 201c and a second bearing-holding part 202c that share a center axis are respectively provided to a center section of the first end member 201 and a center section of a bottom wall part 202d of the second end member 202. A first bearing 6A and a second bearing 6B that support a rotating shaft 307 of the motor body 3 are held by these bearing-holding parts in a state in which respective center axis thereof coincide. The first bearing 6A and the second bearing 6B are well-known ball bearings in which balls are held between an inner race and an outer race, the bearings being provided in a state in which respective outer races are press-fitted to inner sides of the bearing-holding parts 201c and 202c.

On an outer side of the bottom wall part 202d of the second end member 202 there is formed a cylindrical spigot portion 202e that, when the motor 1 of the present embodiment is attached to a load (not shown), is closely fitted into a socket portion provided to the load side. The motor 1 is positioned with respect to the load by means of the close fitting of the spigot portion and the socket portion.

Another end 307b of the rotating shaft 307 is led to an inner side of the spigot portion 202e, and a coupling member 310 used in order to link the rotating shaft 307 to an input shaft of the load is attached to the other end of the rotating shaft 307.

Figure 5:
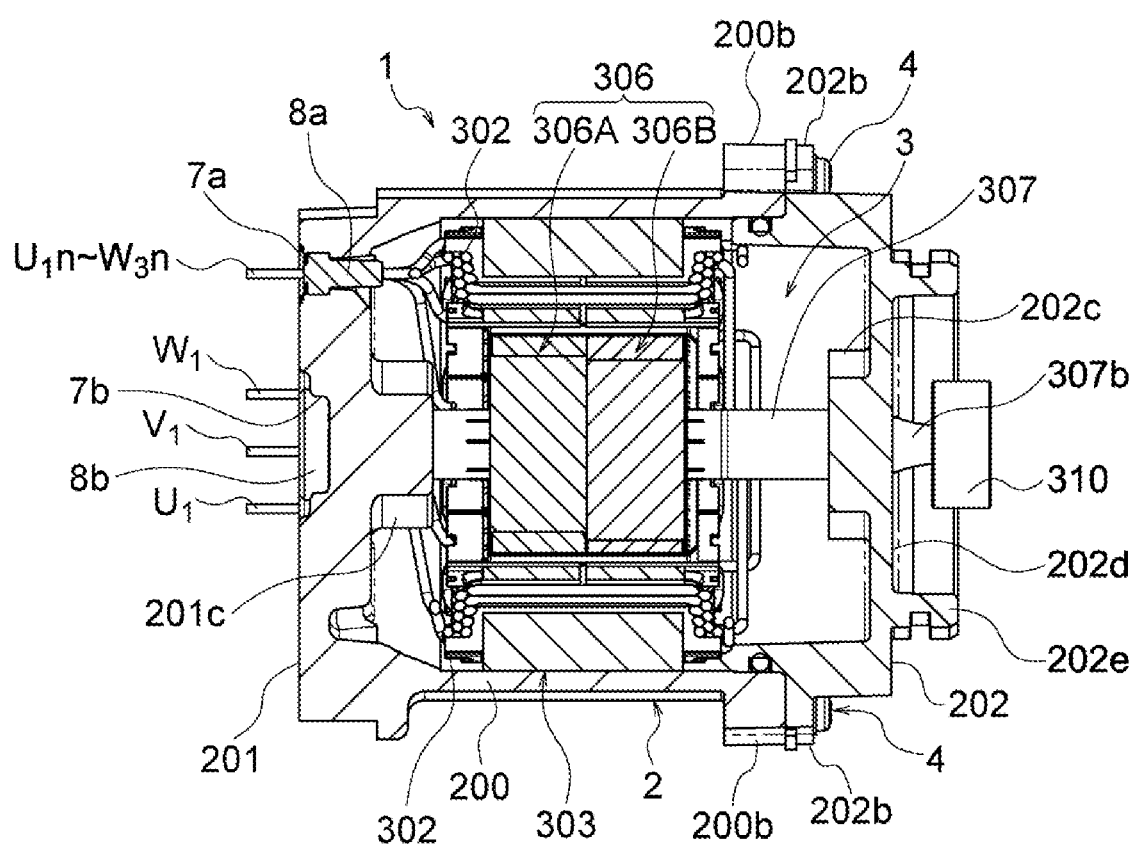
FIG. 5 is a cross-sectional view showing the internal structure of the motor in FIG. 1 in a cross-section along line H-H in FIG. 3.

As shown in FIGS. 4 and 5, the motor body 3 is provided with a stator 303 and a rotor 306. The stator 303 has an annular stator core 301 having numerous teeth on an inner-peripheral side, and a multiphase stator coil 302 configured by winding a magnet wire around the teeth of the stator core 301. The stator 303 is held by an inner periphery of the motor housing 2 (an inner periphery of the cylindrical part 200) in a state in which a center axis thereof coincides with a center axis of the motor housing 2.

The rotor 306 is provided with: a rotor core 304; permanent magnets 305 that are attached to an outer periphery of the rotor core 304 in order to constitute a multipolar magnetic field; and the rotating shaft 307, which is provided in a state of passing through an axial center part of the rotor core 304. The rotor 306 is arranged on an inner side of the stator 303 in a state of sharing a same center axis as the stator. The rotating shaft 307 is supported, due being closely fitted with inner races of the first bearing 6A and the second bearing 6B, so as to be capable of rotating relative to the motor housing 2.

In the example shown in the drawings, in order to improve characteristics of the motor (e.g., to reduce torque ripple), the rotor 306 is configured from two divided rotors 306A and 306B that are arranged so as to be lined up in an axial direction in a state in which phases of the magnetic fields of the magnets are shifted. However, the present invention is not limited to cases where such a rotor is used.

The electric motor 1 in the present embodiment is a brushless DC motor in which the rotor 306 is caused to rotate by controlling excitation of the stator coil in accordance with a rotation-angle position of the rotor 306. However, it is possible to implement the present invention irrespective of what type of motor is used.

Figure 16:
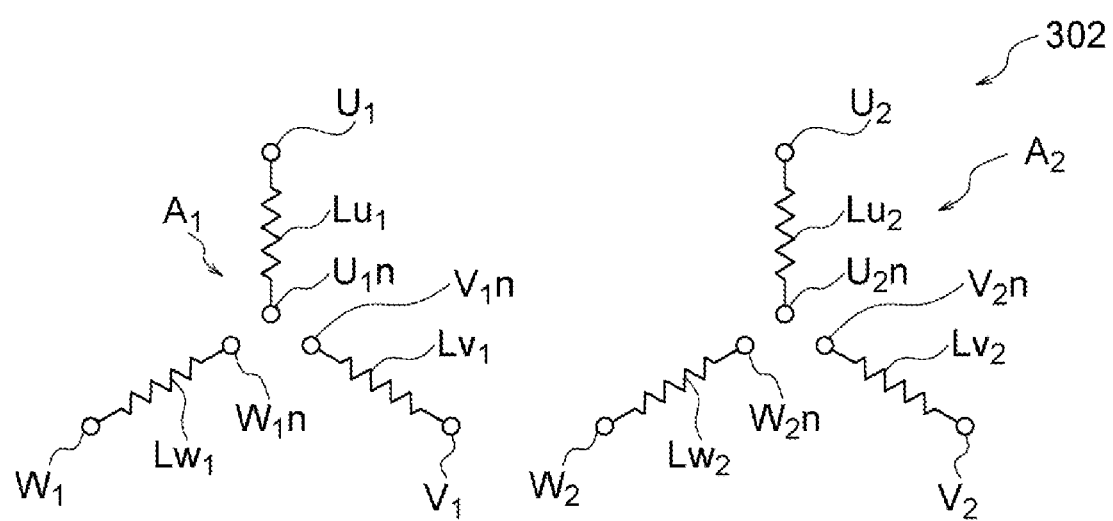
FIG. 16 is a circuit diagram showing an example of a configuration of a multiphase stator coil used in the one embodiment of the present invention.

In the present embodiment, the stator coil 302 comprises two systems, i.e., coils A1 and A2, as shown in FIG. 16. The first-system coil A1 comprises three-phase (U to W) coils Lu1 to Lw1, and the second-system coil A2 comprises three-phase (U to W) coils Lu2 to Lw2.

In the present embodiment, one-end-side terminal sections and other-end-side terminal sections of magnet wires that constitute each of the three-phase coils Lu1 to Lw1 of the first-system coil are led out to an exterior as non-neutral-point-side lead wires u1 to w1 and neutral-point-side lead wires u1n to w1n, respectively, and the neutral-point-side lead wires u1n to w1n are electrically connected to each other outside the motor, whereby the three-phase coils Lu1 to Lw1 are wired in a star formation.

Similarly, one-end-side terminal sections and other-end-side terminal sections of magnet wires that constitute each of the three-phase coils Lu2 to Lw2 of the second-system coil are led out to an exterior as non-neutral-point-side lead wires u2 to w2 and neutral-point-side lead wires u2n to w2n, respectively, and the neutral-point-side lead wires u2n to w2n are electrically connected to each other outside the motor, whereby the three-phase coils Lu2 to Lw2 are wired in a star formation.

As indicated above, in the present embodiment, six non-neutral-point-side lead wires u1, v1, w1, u2, v2, w2 and six neutral-point-side lead wires u1n, v1n, w1n, u2n, v2n, w2n are led out to the exterior. For the purpose of leading out the lead wires, first to third wire leading-out holes 7a, 7b, and 7c are provided in the end member 201 that closes the one axial end of the motor housing, the wire leading-out holes 7a, 7b, and 7c each being such that one end is open to the exterior and the other end is open to an interior of the motor housing.

The wire leading-out holes are formed so that center axis thereof are oriented in a prescribed wire-leading-out direction, and so that an area required for leading out a prescribed number of lead wires is imparted to horizontal cross-sections (cross-sections along a plane orthogonal to the center axis) in each section along an axial direction of the wire leading-out holes. The wire leading-out holes are also formed so that a cross-sectional area of the horizontal cross-sections in each section along the axial direction is of an appropriate size for wire covers (described below) to be inserted and held within the wire leading-out holes.

In the present embodiment, a contour shape of the horizontal cross-section of the wire leading-out holes is formed so as to attain a shape of a long hole having a pair of long-edge sections that extend parallel to each other along one direction and a pair of arch-shaped short-edge sections that join adjacent end parts at one end and another end of the long-edge sections. A length of the long-edge sections of the wire leading-out holes is suitably established in accordance with the number of lead wires led out through the wire leading-out holes.

Figure 3:
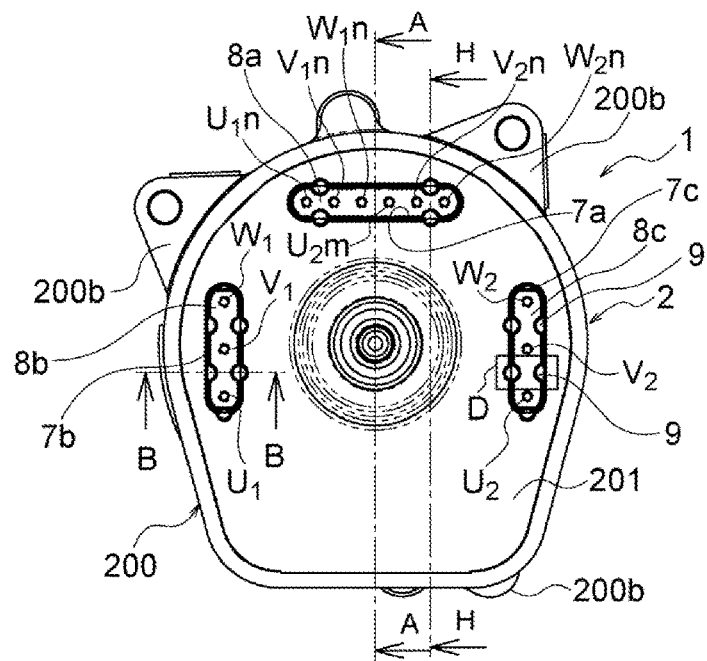
FIG. 3 is a front view showing the motor shown in FIG. 1 from one end side of a motor housing.

A first wire leading-out hole 7a is provided in a state in which, when the end member 201 that closes the one axial end of the motor housing 2 is viewed from a front surface as shown in FIG. 3, a longitudinal direction of the first wire leading-out hole 7a is oriented in a horizontal direction above the rotating shaft. A second wire leading-out hole 7b and a third wire leading-out hole 7c are provided in a state in which respective longitudinal directions thereof are oriented in vertical directions to the left and right of the rotating shaft.

The lead wires led out to the exterior from the motor housing 2 are shaped so as to extend linearly along the prescribed leading-out direction on one axial-end side of the motor housing 2, and are led out to the exterior through prescribed wire leading-out holes. In the present embodiment, the wire leading-out holes attain an elongated shape, and therefore a series of lead wires led out through the wire leading-out holes are arranged so as to be lined up in a row along the longitudinal directions of the wire leading-out holes.

In the present embodiment, the six neutral-point-side lead wires u1n, v1n, w1n, u2n, v2n, w2n are led out through the first wire leading-out hole 7a. In order to orient the lead wires in the prescribed leading-out direction and electrically insulate the lead wires with respect to the end member 201, a first wire cover 8a formed from a hard insulating resin is inserted into the first wire leading-out hole 7a, and the lead wires u1n, v1n, w1n, u2n, v2n, w2n are led out to the exterior through six through-holes that pass through the first wire cover 8a in an axial direction.

Three non-neutral-point-side lead wires u1, v1, w1 led out from the first-system coil A1 are aligned so as to be lined up along a longitudinal direction of the second wire leading-out hole 7b and are led out in the prescribed leading-out direction through through-holes provided in a second wire cover 8b that is inserted into the second wire leading-out hole 7b. Three non-neutral-point-side lead wires u2, v2, w2 led out from the second-system coil A2 are aligned so as to be lined up along a longitudinal direction of the third wire leading-out hole 7c and are led out in the prescribed leading-out direction through through-holes provided in a third wire cover 8c that is inserted into the third wire leading-out hole 7c.

Among the first to third wire covers 8a to 8c, the second wire cover 8b and the third wire cover 8c that lead out three lead wires are configured in a completely identical manner. Because the first wire cover 8a leads out six lead wires, a longitudinal dimension of a horizontal cross-section thereof is established so as to be less than a longitudinal dimension of a horizontal cross-section of the second wire cover 8b and the third wire cover 8c, which route only three lead wires; however, a basic configuration of the first wire cover 8a is similar to that of the second wire cover 8b and the third wire cover 8c. Therefore, a configuration of the wire covers used in the present embodiment is described below through an example of wire covers used as the second wire cover 8b and the third wire cover 8c.

Figure 14:
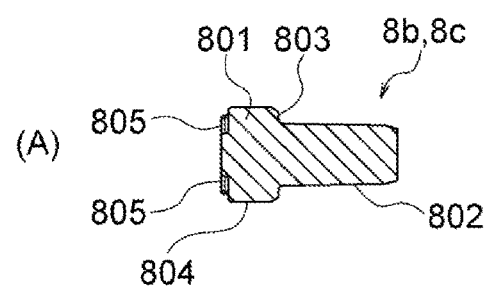
FIG. 14(A) is a cross-sectional view showing the wire cover shown in FIG. 11 in a cross-section along line I-I in FIG. 12.
FIG. 14(B) is a cross-sectional view showing the wire cover shown in FIG. 11 along line J-J in FIG. 12.
FIG. 14(C) is a detailed view of section K in FIG. 14(B)
Figure 14:
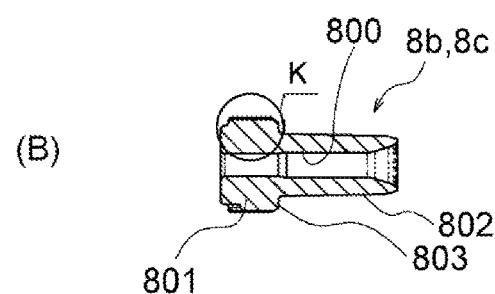
Figure 14:
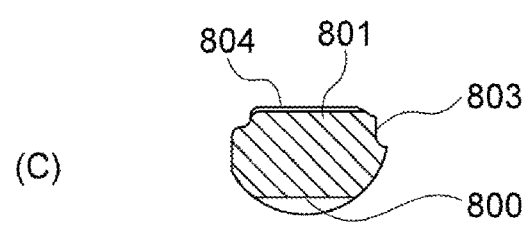
Figure 15:
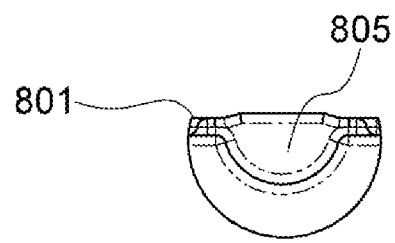
FIG. 15 is a detailed view of section M in FIG. 12.

A structure of the wire covers 8b, 8c used in the present embodiment is described in detail with reference to FIGS. 11 to 14. As shown in FIGS. 14(A) and 14(B), the wire covers 8b, 8c each integrally have a head part 801 arranged near one axial end of the wire leading-out hole (i.e., on an end side of the wire leading-out hole that opens toward the exterior) when the wire covers 8b, 8c are inserted into corresponding wire leading-out holes, and a trunk part 802 arranged closer to the other axial-end side of the wire leading-out hole (i.e., on an end side of the wire leading-out hole that opens on the motor-housing side) than the head part 801.

Figure 12:
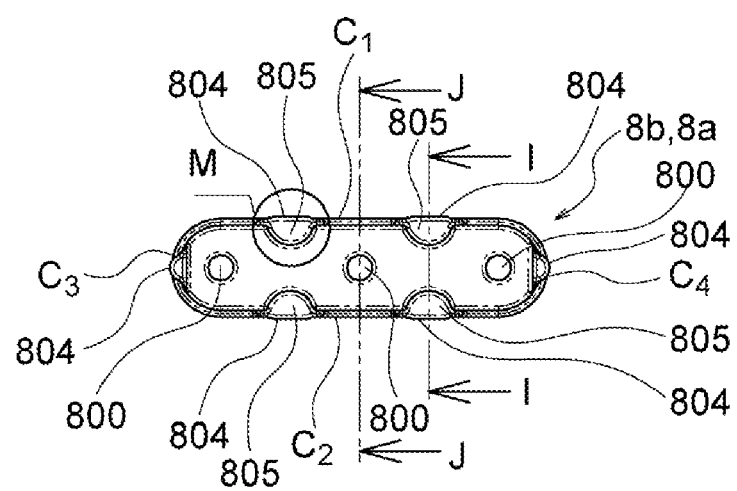
FIG. 12 is a top view of the wire cover shown in FIG. 11.
Figure 13:
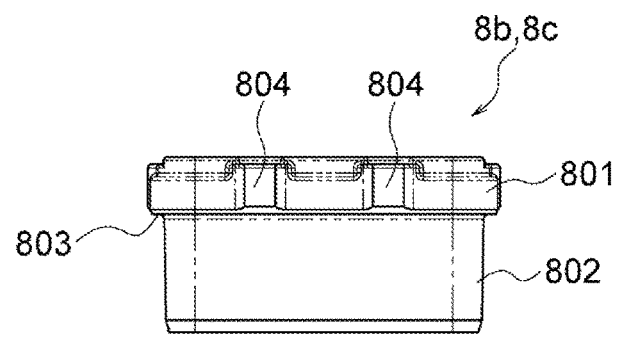
FIG. 13 is a front view of the wire cover shown in FIG. 11.

As shown in FIG. 12, a contour line of a horizontal cross-section of the head part 801 of the wire cover is formed so as to attain a long and narrow shape having; a pair of long-edge portions C1, C2 (see FIG. 12) that extend parallel to each other along a direction along which the lead wires are lined up; and a pair of arch-shaped short-edge portions C3, C4 that join adjacent end parts at both ends of the long-edge portions. A contour line of a horizontal cross-section of the trunk part 802 is formed so as to attain a shape substantially similar to that of the contour line of the horizontal cross-section of the head part 801.

The head part 801 of the wire cover has an enlarged shape such that the contour line of the horizontal cross-section of the head part 801 is arranged further to the outer side than the contour line of the horizontal cross-section of the trunk part 802. An end part of the head part 801 that is near the trunk part 802 (i.e., a portion jutting further to the outer side than a side surface of the trunk part 802) is formed as a received part 803 that is received by a wire-cover-receiving part provided to an inner side of the corresponding wire leading-out hole.

In addition, through-holes 800 that extend linearly along the axial direction of the wire leading-out holes when the wire covers 8b, 8c are inserted into the wire leading-out holes are provided in a number (three in the example shown in the drawings) that corresponds to the number of lead wires led out through the respective wire covers.

A plurality of crush ribs 804, 804, . . . , are provided to side surfaces of the head part 801 of the wire cover in a state of being lined up along a circumferential direction of the corresponding wire leading-out hole, the crush ribs 804 protruding from the side surfaces. In the example shown in FIGS. 11 to 13, two crush ribs 804 are provided to each of side surfaces that oppose each other in a width direction of the head part 801 (a direction perpendicular to the longitudinal direction), and one crush rib 804 is provided to each side surface at two longitudinal ends of the head part 801.

The wire cover also is configured so as to have a plurality of recesses in end parts that are arranged near one axial end of the wire leading-out hole within the wire leading-out hole. In the present embodiment, a plurality of recesses 805 are formed in an outer end surface of the head part 801 of the wire cover. In the example shown in the drawings, two recesses 805 are formed along each of the pair of long-edge parts C1, C2 of the head part 801. The recesses are provided in order for the wire cover to be pressed down and restrained within the wire leading-out hole after the wire cover has been inserted into the corresponding wire leading-out hole, and in order to accept metal that flows when a swaged part established in the open end of the wire leading-out hole is swaged.

In the wire holes into which the wire covers are inserted, at least a portion near a section that is open to the exterior (i.e., a portion that accommodates the head part 801) has a contour shape similar to a contour shape of the horizontal cross-section of the head part 801 of the wire cover and is of a size that makes it possible to accept a body portion of the head part 801, excluding the crush ribs, with a required minimum clearance.

Figure 6:
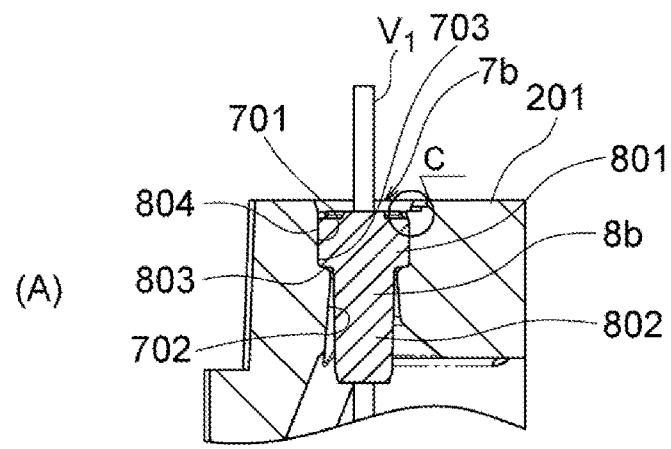
FIG. 6(A) is a cross-sectional view showing a part of the motor shown in FIG. 1 in a cross-section along line B-B in FIG. 3.
FIG. 6(B) is a detailed view of section C in FIG. 6(A)
Figure 6:
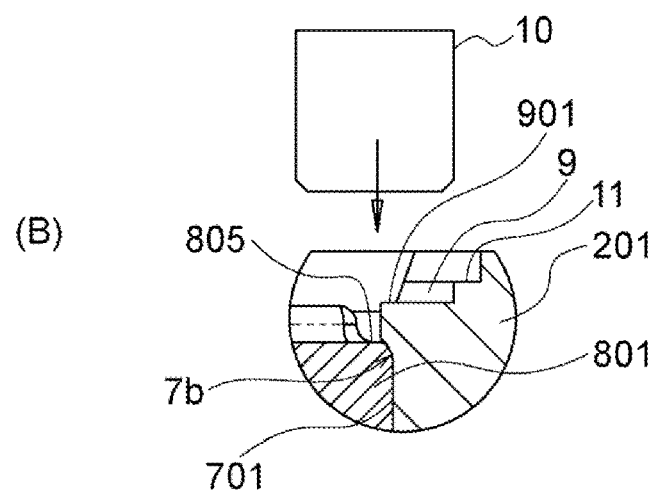
Figure 7:
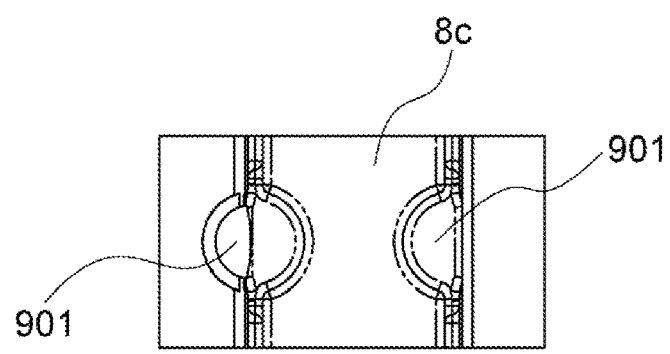
FIG. 7 is a detailed view of section D in FIG. 3.
Figure 8:
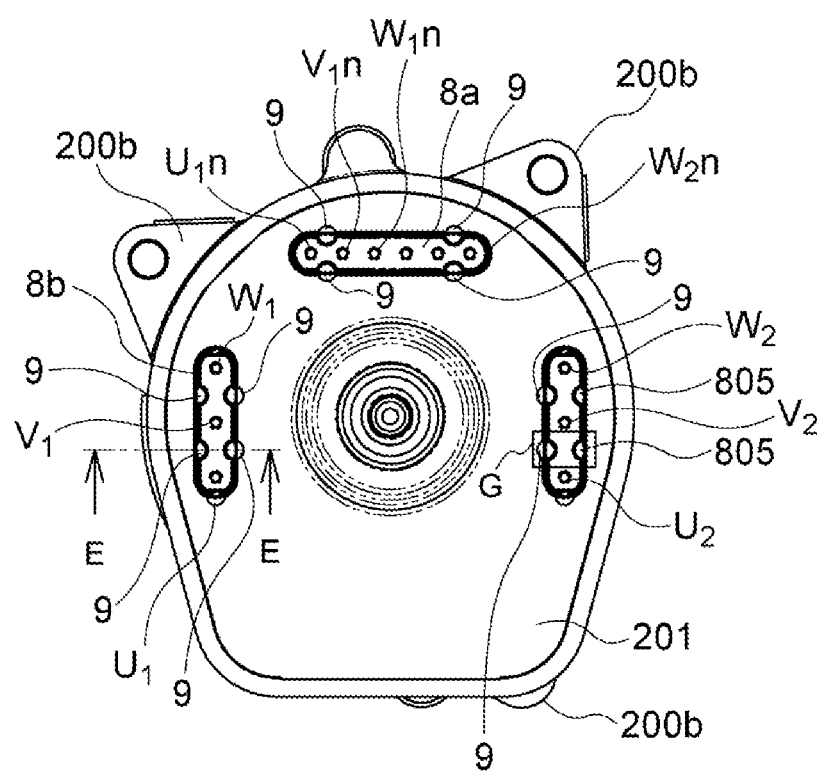
FIG. 8 is a front view of the motor in a state prior to swaging of a swaged part established on an end member that closes the one end of the motor housing.
Figure 9:
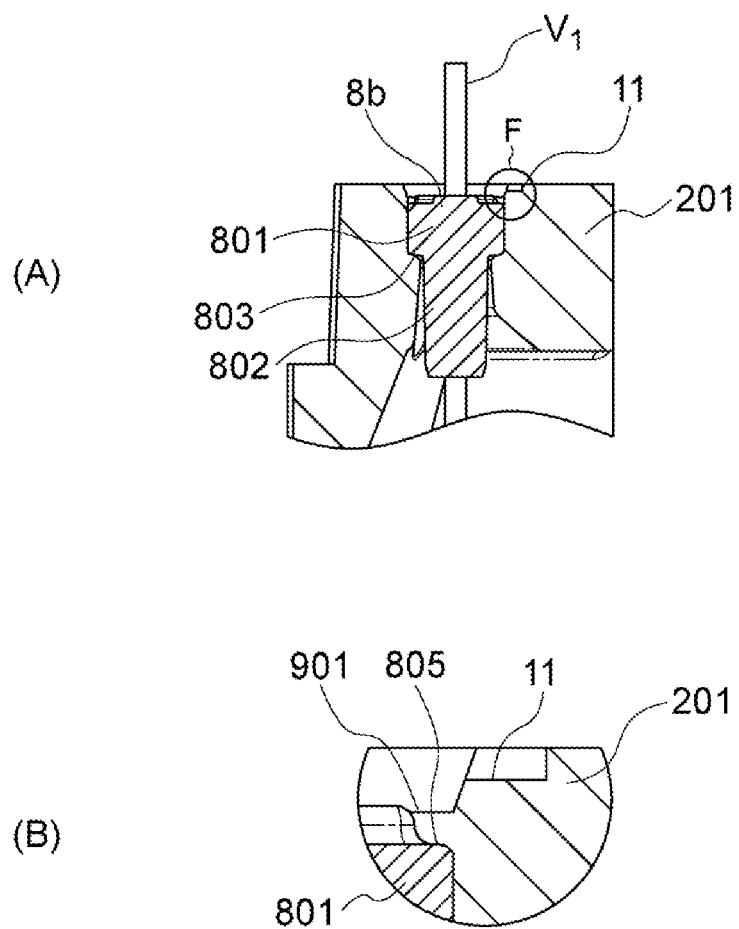
FIG. 9(A) is a cross-sectional view showing a part of the motor in FIG. 1 in a cross-section along line E-E in FIG. 8.
FIG. 9(B) is a detailed view of section F in FIG. 9(A)
Figure 10:
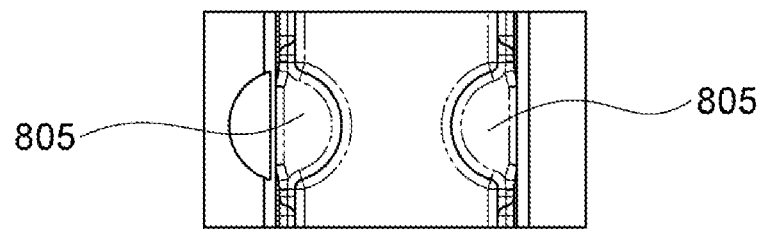
FIG. 10 is a detailed view of section G in FIG. 8.
Figure 11:
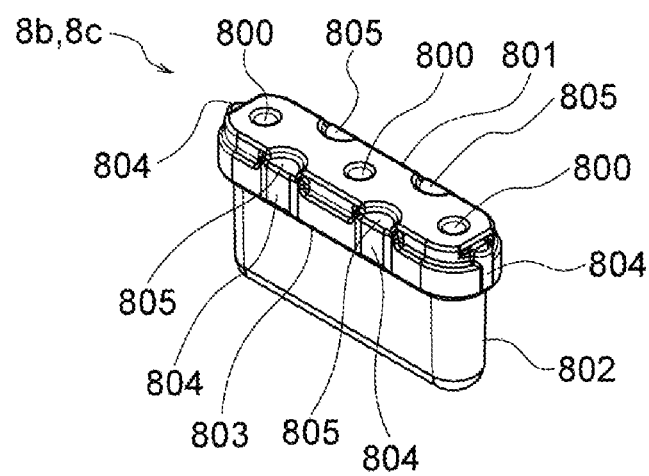
FIG. 11 is a perspective view showing a wire cover used in the embodiment shown in FIG. 1.

In the present embodiment, the wire leading-out hole 7b is formed from a first hole section 701 that accommodates the head part 801 of the wire cover 8b and a second hole section 702 that accommodates the trunk part 802 of the wire cover, as shown in FIG. 6. The first hole section 701 has a contour shape similar to the contour shape of a horizontal cross-section of the head part 801 of the wire cover and is of a size that makes it possible to accept a body portion of the head part 801 of the wire cover, excluding the crush ribs, with a small clearance. The second hole section 702 is of a size that makes it possible to accept the trunk part 802 of the wire cover with some clearance, but a first-hole-section 701-side end part of the second hole section 702 has a cross-sectional area smaller than a cross-sectional area of a horizontal cross-section of the first hole section 701. As can be seen in FIG. 6(A), an inner surface of the second hole section 702 is tapered such that a cross-sectional area of the second hole section 702 increases commensurately with increases in a distance from the first hole section 701. A wire-cover-receiving part 703 having a portion oriented toward the received-part 803 side of the wire cover inserted into the wire leading-out hole (i.e., a portion oriented in the leading-out direction of the lead wires) is formed at a boundary section between the first hole section 701 and the second hole section 702 (i.e., at a second-hole-section 702-side end part of the first hole section 701). The other wire leading-out holes are also configured in the same manner.

The crush ribs 804 provided to the side surfaces of the head parts 801 of the wire covers 8b, 8c are such that a protrusion height of the crush ribs from the side surfaces of the head parts of the wire covers and a cross-sectional area of each of the crush ribs are established so that the crush ribs are crushed before an excessive force that would damage the head part acts on the entirety of the head parts of the wire covers when the wire covers are inserted into the corresponding wire leading-out holes. Therefore, due to the crushing of the crush ribs 804, the wire covers are press-fitted into the corresponding wire leading-out holes without being damaged.

The wire covers also are inserted into the wire leading-out holes until the received parts 803 of the wire covers butt against the wire-cover-receiving parts 703 provided to inner sides of the corresponding wire leading-out holes and the received parts 803 reach a state of being received by the receiving parts 703.

When the crush ribs 804 are provided to the side surfaces of the wire covers as indicated in the present embodiment, it is possible to configure the wire covers into a press-fitted state in a state in which force is concentrated on portions of the crush ribs 804 when the wire covers are inserted into the wire leading-out holes, and in which only the portions of the crush ribs have been crushed; therefore, the wire covers formed from the hard insulating resin can be held in a press-fitted state within the wire leading-out holes without damage to the wire covers. In addition, the wire covers are press-fitted within the wire leading-out holes in a state in which the received parts 803 of the wire covers have butted against the wire-leading-out-hole-side wire-cover-receiving parts 703, and therefore it is possible to prevent the wire covers from inclining within the wire leading-out holes. Moreover, the wire covers are formed from the hard insulating resin and do not readily deform, and therefore it is possible to impart high precision to the leading-out direction of the lead wires.

If a margin in close fitting of the head part of the wire cover and the first hole section of the wire leading-out hole is too large or the protrusion height of the crush ribs is too great, there is a concern that non-negligible inclination will occur in the wire cover within the wire leading-out hole when the crush ribs are crushed and the wire cover is press-fitted into the wire leading-out hole. Therefore, the margin in close fitting of the head part of the wire cover and the first hole section of the wire leading-out hole, and the protrusion height of the crush ribs, are preferably established at required minimum magnitudes.

In the present embodiment, the margin in close fitting of a body portion of the head part 801 of the wire cover, excluding the crush ribs 804, and the first hole section 701 of the wire leading-out hole, and also the protrusion height of the crush ribs 804 from the side surfaces of the head part 801, are established so that when the wire covers are configured in a state in which the crush ribs 804 of the wire covers have been crushed and the wire covers are press-fitted into the corresponding wire leading-out holes, and in which the received parts 803 of the wire covers are received by the wire-cover-receiving parts 703 within the wire leading-out holes, deviation arising between center axis of the wire covers and center axis of the wire leading-out holes is kept within a permissible range. The protrusion height of the crush ribs 804 from the side surfaces of the head part 801 of the wire cover is established at a suitable magnitude in consideration of dimensional tolerance of the wire cover.

In the present embodiment, in order to make positioning and securing of the wire covers within the wire leading-out holes more reliable, a plurality of swaged parts 9 (see FIG. 3) that are lined up along a circumferential direction of an opening at one axial end of each of the wire leading-out holes are established in the end member 201, and the plurality of swaged parts 9 are swaged so as to come into contact with the wire covers inserted into the wire leading-out holes, whereby the wire covers are restrained within the wire leading-out holes in a state in which the received parts 803 of the wire covers are pressed against the receiving parts 703 provided to the inner sides of the wire leading-out holes. The swaged parts 9 are swaged by pressing a swaging pin 10 into the swaged parts, as shown in FIG. 6(B). Due to the pressing of the swaging pin 10, recesses 11 are formed in the swaged parts 9, and a metal 901 that had constituted portions where the recesses 11 are formed flows toward the head parts 801 of the wire covers and is accepted into the recesses 805 formed in the end surfaces of the head parts 801.

In order to maximally reduce deviation arising between the center axis of the wire covers and the center axis of the wire leading-out holes in a state in which the wire covers are press-fitted into the corresponding wire leading-out holes, it is desirable to adopt a configuration in which force acts equally on the plurality of crush ribs formed in the head parts of the wire covers during press-fitting of the wire covers into the corresponding wire leading-out holes. Therefore, at least portions of the wire covers at which the crush ribs are provided, and at least portions of the wire leading-out holes at which the portions where the crush ribs are provided to the wire covers are press-fitted, are preferably formed so that the contour shapes of the horizontal cross-sections in each section along each of the axial directions have N-fold symmetry (where N is an integer equal to or greater than 2) with respect to the respective center axis.

In the present embodiment, the wire covers and the wire leading-out holes into which the wire covers are press-fitted are formed so that the contour shapes of the horizontal cross-sections of each of the head parts 801 of the wire covers and the first hole sections 701 of the wire leading-out holes have two-fold symmetry with respect to the respective center axis. Specifically, the wire covers and the wire leading-out holes into which the wire covers are press-fitted are formed so that when the wire covers 8b, 8c and the wire leading-out holes 7b, 7c are caused to rotate about the respective center axis, at least the contour shape of the horizontal cross-section of the head parts 801 of the wire covers and the contour shape of the horizontal cross-section of the first hole sections 701 of the wire leading-out holes have rotational symmetry so as to overlap an original shape with each rotation of (360/2) degrees.

In order for force to be applied in a substantially equal manner to each part of the wire covers when the swaged parts 9 of the end member 201 that are established at the peripheral edge of the openings in the wire leading-out holes are swaged after the crush ribs 804 have been crushed and the wire covers have been press-fitted into the corresponding wire leading-out holes, it is desirable for rotational symmetry to be imparted additionally to an array of the swaged parts 9, of which a plurality are established, and to an array of the plurality of recesses 805 provided to the head parts of the wire covers.

In order to impart high precision to the leading-out direction of the lead wires by passing the lead wires through the through-holes 800 provided to the wire covers, it is necessary to impart a sufficient length to the through-holes 800 in the wire covers, and it is also necessary to establish axial dimensions of the wire covers at a sufficient magnitude to provide the through-holes 800 with the necessary length. It is additionally necessary to establish an axial length (depth) of the wire leading-out holes provided in the end member 201 at or above a magnitude at which at least the head parts of the wire covers can be accommodated. In cases where the end member 201 is configured as a cast article, it is necessary to impart a thickness necessary to provide the wire leading-out holes in the end member 201.

In cases where the motor housing is manufactured by press working, the cylindrical part having the wire leading-out holes in the inner side thereof is molded at a prescribed portion of the end member that closes the one end of the cylindrical part.

A configuration of the wire covers 8b, 8c that lead out three lead wires has been described above; the wire cover 8a that leads out six lead wires is configured in the same manner as the wire covers 8b, 8c, except that longitudinal dimensions of the wire cover 8a are established so as to be greater than longitudinal dimensions of the wire covers 8b, 8c, such that six through-holes 800 for passage of the lead wires are provided, and three crush ribs 804 are provided to side surfaces of the head part 801.

As shown in FIG. 4, the motor according to the present example is used in a form in which a mechanically and electrically integrated drive device is configured by attaching suitable electrical units 20 provided with, inter alia, circuits that channel a drive current to the stator coil to an outer side of the first end member 201 of the motor housing 2, and by connecting the distal ends of the lead wires led out to the exterior through the through-holes in the wire covers to terminal sections provided to the electrical-unit 20 side.

In the example shown in the drawings, the distal ends of the six lead wires u1$n$, v1$n$, w1$n$, u2$n$, v2$n$, w2$n$ led out to the exterior through the through-holes in the wire cover 8a are directly connected to terminal sections t1 to t6 of a circuit board 21 provided within the electrical unit 20, and the distal ends of the three lead wires u1, v1, w1 led out through the through-holes 800 in the wire cover 8b are directly connected to terminal sections tu, tv, tw provided to the circuit board 21. In addition, lead wires u2, v2, w2 led out through the through-holes in the wire cover 8c are directly connected to prescribed terminal sections provided to the circuit board 21 (although this relationship is not shown in the drawings).

The six lead wires u1$n$, v1$n$, w1$n$, u2$n$, v2$n$, w2$n$ are connected to each other by an electroconductive pattern provided to the circuit board 21 and are configured as neutral points. The lead wires u1, v1, w1 and u2, v2, w2 are connected, via a wiring pattern on the circuit board, to output terminals of a drive circuit configured from an electronic component mounted on the circuit board 21 within the electrical unit 20.

According to the present embodiment, the precision of the leading-out direction of the lead wires led out to the exterior from the motor housing 2 can be increased; therefore, it is possible to keep an amount by which distal-end positions of the lead wires deviate from prescribed positions (positions suited for connecting to electrical-unit-side terminal sections) within a permissible range. Therefore, it is possible to enable automatic connection of the distal ends of the lead wires and the electrical-unit-side terminal sections using an automatic assembly machine, and it is also possible to enable an operation for assembling the device to be performed efficiently. The connection of the distal ends of the lead wires and the electrical-unit-side terminal sections is performed by soldering, welding (for example, TIG welding), etc.

In the embodiment described above, the plurality of lead wires led out from the wire leading-out holes were arranged so as to be lined up in a row; therefore, the shape of the horizontal cross-section of the wire covers was configured so as to be elongated in a direction along which the led out lead wires are lined up. However, the contour shape of the horizontal cross-section of the wire covers may be configured so as to be round, regularly polygonal, or another suitable shape. In cases where the contour shape of the horizontal cross-section of the wire covers is configured so as to be round or regularly polygonal, it is possible to impart three-fold or higher rotational symmetry to the contour shape of the horizontal cross-section of the wire covers.

In the embodiment described above, a case where there was used a motor housing 2 of a type in which the end member 201 that closed the one axial end of the cylindrical part 200 was provided integrally with the cylindrical part 200, and in which the end member 202 that closed the other axial end of the cylindrical part 200 was provided separately from the cylindrical part 200, was used as an example. However, the present invention can also be applied to cases where a motor housing of a type in which the cylindrical part 200 is divided into two housing halves midway along the axial direction, a motor housing in which both the end member 201 that closes the one axial-end side of the cylindrical part 200 and the end member 202 that closes the other axial-end side of the cylindrical part 200 are provided separately from the cylindrical part 200, or another type of motor housing is used.

In the embodiment described above, the head parts of the wire covers were configured in such a shape as to be enlarged to a greater extent than the trunk parts. However, it is also possible to adopt a configuration in which a substantially equal area is imparted to horizontal cross-sections of entire body portions of the wire covers, excluding the crush ribs, and in which the body portions of the wire covers are formed in a straight shape. In this case, portions of the wire covers to which the crush ribs 804 are provided are referred to as head parts of the wire covers, and portions of the wire covers other than the head parts are referred to as trunk parts of the wire covers.

In cases where the entire body portions of the wire covers, excluding the crush ribs, are formed in a straight shape, end parts of the trunk parts of the wire covers that are on the side opposite from the head parts are configured as received parts of the wire covers, and wire-cover-receiving parts having portions that come into contact with the received parts are provided in deep parts of the wire leading-out holes.

EXPLANATION OF NUMERALS AND CHARACTERS

1 Electric motor
2 Motor housing
200 Cylindrical part
201 First end member
201c First bearing-holding part
202 Second end member
202c Second bearing-holding part
3 Motor body
301 Stator core
302 Stator coil
304 Rotor core
305 Permanent magnet
306 Rotor
307 Rotating shaft
4 Bolt
6A First bearing
6B Second bearing
7a to 7c Wire leading-out hole
701 First hole section
702 Second hole section
703 Wire-cover-receiving part
8a to 8c Wire cover
800 Through-hole
801 Head part of the wire cover
802 Trunk part of the wire cover
803 Received part of the wire cover
804 Crush rib provided to the wire cover
805 Recess provided to the wire cover
9 Swaged part
10 Swaging pin
u1n, v1n, w1n, u2n, v2n, w2n Neutral-point-side lead wire
u1, v1, w1, u2, v2, w2 Non-neutral-point-side lead wire
20 Electrical unit
21 Circuit board
t1 to t6, tu to tw Terminal section to which distal end of lead wire is connected

What is claimed is:

1. An electric motor in which a motor body is accommodated in a motor housing, the motor body comprising a stator that has a multiphase stator coil wound by a magnet wire and a rotor in which a magnetic field is configured by permanent magnets, the electric motor being such that a wire leading-out hole of which one axial end opens to an exterior and another axial end opens within the motor housing is provided in a metal end member that closes one axial end of the motor housing in a state in which an axis of the wire leading-out hole is oriented in a prescribed wire leading-out direction, among terminal portions of the magnet wire constituting the multiphase stator coil, terminal portions that must be led out to the exterior are used as lead wires, the lead wires are shaped so as to extend linearly along the prescribed wire leading-out direction through the wire leading-out hole, a wire cover that is formed from an insulating resin and has through-holes extending linearly is inserted into the wire leading-out hole in a state in which axis of the through-holes are oriented in the prescribed wire leading-out direction, and the lead wires are led out in the prescribed wire leading-out direction through the through-holes provided in the wire cover, wherein the wire cover has, on side surfaces thereof, a plurality of crush ribs that are lined up along a circumferential direction of the wire leading-out hole, and is press-fitted into the wire leading-out hole in a state in which the crush ribs have been crushed, the wire cover also comprises a received part that has, at a portion arranged at a position nearer to another axial-end side of the wire leading-out hole than the crush ribs within the wire leading-out hole, a portion oriented toward the other axial-end side of the wire leading-out hole, and a wire cover receiving part is provided to an inner side of the wire leading-out hole, the wire cover receiving part having a portion oriented toward the received part of the wire cover inserted into the wire leading-out hole, and the received part of the wire cover inserted into the wire leading-out hole being received by the wire cover receiving part, wherein the wire cover integrally has a head part arranged near one axial end of the wire leading-out hole when the wire cover is inserted into the wire leading-out hole, and a trunk part arranged closer to the other axial-end side of the wire leading-out hole than the head part;

the head part of the wire cover has an enlarged shape such that a contour line of a horizontal cross-section of the head part is arranged further to the outer side than a contour line of a horizontal cross-section of the trunk part, and the received part is formed at the end part of the head part that is near the trunk part;

the wire leading-out hole has a first hole section that accommodates the head part of the wire cover, and a second hole section that accommodates the trunk part of the wire cover, the wire cover receiving part being provided at a boundary section between the first hole section and the second hole section; and the plurality of crush ribs are provided in a state of protruding from the side surfaces of the head part of the wire cover.

2. An electric motor in which a motor body is accommodated in a motor housing, the motor body comprising a stator that has a multiphase stator coil wound by a magnet wire and a rotor in which a magnetic field is configured by permanent magnets, the electric motor being such that a wire leading-out hole of which one axial end opens to an exterior and another axial end opens within the motor housing is provided in a metal end member that closes one axial end of the motor housing in a state in which an axis of the wire leading-out hole is oriented in a prescribed wire leading-out direction, among terminal portions of the magnet wire constituting the multiphase stator coil, terminal portions that must be led out to the exterior are used as lead wires, the lead wires are shaped so as to extend linearly along the prescribed wire leading-out direction through the wire leading-out hole, a wire cover that is formed from a hard an insulating resin and has through-holes extending linearly is inserted into the wire leading-out hole in a state in which axis of the through-holes are oriented in the prescribed wire leading-out direction, and the lead wires are led out in the prescribed wire leading-out direction through the through-holes provided in the wire cover, wherein the wire cover has, on side surfaces thereof, a plurality of crush ribs that are lined up along a circumferential direction of the wire leading-out hole, and is press-fitted into the wire leading-out hole in a state in which the crush ribs have been crushed, the wire cover also comprises a received part that has, at a portion arranged at a position nearer to another axial-end side of the wire leading-out hole than the crush ribs within the wire leading-out hole, a portion oriented toward the other axial-end side of the wire leading-out hole, and a wire cover receiving part is provided to an inner side of the wire leading-out hole, the wire cover receiving part having a portion oriented toward the received part of the wire cover inserted into the wire leading-out hole, and the received part of the wire cover inserted into the wire leading-out hole being received by the wire cover receiving part, wherein a plurality of swaged parts lined up along a circumferential direction of an opening at one axial end of the wire leading-out hole are established at the end member, and the plurality of swaged parts are swaged so as to come into contact with the wire cover inserted into the wire leading-out hole, whereby the received part of the wire cover is pressed against the receiving part provided to the inner side of the wire leading-out hole.

3. The electric motor according to claim 2, wherein the wire cover has a plurality of recesses respectively corresponding to the plurality of swaged parts, the plurality of recesses being provided to an end part that is arranged near one axial end of the wire leading-out hole within the wire leading-out hole; and swaged portions of the swaged parts are accepted by the corresponding recesses.

4. The electric motor according to claim 3, wherein the wire cover integrally has a head part arranged near one axial end of the wire leading-out hole when the wire cover is inserted into the wire leading-out hole, and a trunk part arranged closer to the other axial-end side of the wire leading-out hole than the head part;

the head part of the wire cover has an enlarged shape such that a contour line of a horizontal cross-section of the head part is arranged further to the outer side than a contour line of a horizontal cross-section of the trunk part, and the received part is formed at the end part of the head part that is near the trunk part;

the wire leading-out hole has a first hole section that accommodates the head part of the wire cover, and a second hole section that accommodates the trunk part of the wire cover, the wire cover receiving part being provided at a boundary section between the first hole section and the second hole section; and the plurality of crush ribs are provided in a state of protruding from the side surfaces of the head part of the wire cover.

5. The electric motor according to claim 4, wherein at least portions of the wire cover at which the crush ribs are provided, and at least portions of the wire leading-out hole at which the portions where the crush ribs are provided to the wire cover are press-fitted, are formed so that contour shapes of horizontal cross-sections in each section along each of the axial directions have N-fold symmetry (where N is an integer equal to or greater than 2) with respect to the respective center axis.

6. The electric motor according to claim 4, wherein an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

7. The electric motor according to claim 3, wherein at least portions of the wire cover at which the crush ribs are provided, and at least portions of the wire leading-out hole at which the portions where the crush ribs are provided to the wire cover are press-fitted, are formed so that contour shapes of horizontal cross-sections in each section along each of the axial directions have N-fold symmetry (where N is an integer equal to or greater than 2) with respect to the respective center axis.

8. The electric motor according to claim 3, wherein an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

9. The electric motor according to claim 2, wherein
the wire cover integrally has a head part arranged near one axial end of the wire leading-out hole when the wire cover is inserted into the wire leading-out hole, and a trunk part arranged closer to the other axial-end side of the wire leading-out hole than the head part;
the head part of the wire cover has an enlarged shape such that a contour line of a horizontal cross-section of the head part is arranged further to the outer side than a contour line of a horizontal cross-section of the trunk part, and the received part is formed at the end part of the head part that is near the trunk part;
the wire leading-out hole has a first hole section that accommodates the head part of the wire cover, and a second hole section that accommodates the trunk part of the wire cover, the wire cover receiving part being provided at a boundary section between the first hole section and the second hole section; and
the plurality of crush ribs are provided in a state of protruding from the side surfaces of the head part of the wire cover.

10. The electric motor according to claim 9, wherein at least portions of the wire cover at which the crush ribs are provided, and at least portions of the wire leading-out hole at which the portions where the crush ribs are provided to the wire cover are press-fitted, are formed so that contour shapes of horizontal cross-sections in each section along each of the axial directions have N-fold symmetry (where N is an integer equal to or greater than 2) with respect to the respective center axis.

11. The electric motor according to claim 9, wherein an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

12. The electric motor according to claim 2, wherein at least portions of the wire cover at which the crush ribs are provided, and at least portions of the wire leading-out hole at which the portions where the crush ribs are provided to the wire cover are press-fitted, are formed so that contour shapes of horizontal cross-sections in each section along each of the axial directions have N-fold symmetry (where N is an integer equal to or greater than 2) with respect to the respective center axis.

13. The electric motor according to claim 12, wherein an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

14. The electric motor according to claim 2, wherein an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

15. The electric motor according to claim 2, wherein at least portions of the wire cover at which the crush ribs are provided, and at least portions of the wire leading-out hole at which the portions where the crush ribs are provided to the wire cover are press-fitted, are formed so that contour shapes of horizontal cross-sections in each section along each of the axial directions have N-fold symmetry where N is an integer equal to or greater than 2 with respect to the respective center axis.

16. The electric motor according to claim 15, wherein an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

17. The electric motor according to claim 2, wherein an electrical unit provided with a circuit that channels a drive current to the stator coil is attached to an outer side of the end member that closes the one axial end of the motor housing, and distal ends of the lead wires led out to the exterior through the through-holes in the wire cover are directly connected to terminal sections provided to the electrical unit.

\* \* \* \* \*

UNITED STATES PATENT AND TRADEMARK OFFICE
CERTIFICATE OF CORRECTION

PATENT NO. : 11,996,751 B2
APPLICATION NO. : 17/277073
DATED : May 28, 2024
INVENTOR(S) : Masafumi Tamai et al.

It is certified that error appears in the above-identified patent and that said Letters Patent is hereby corrected as shown below:

On the Title Page

Item (73) Assignee, Please change "MAHLE ELECTRIC DRIVES JAPAN CORPORATION" to --MAHLE INTERNATIONAL GmbH--.

Signed and Sealed this
Twentieth Day of August, 2024

Katherine Kelly Vidal
Director of the United States Patent and Trademark Office